United States Patent
Christodoulides et al.

(10) Patent No.: US 6,388,800 B1
(45) Date of Patent: May 14, 2002

(54) RAMAN AMPLIFIER WITH GAIN ENHANCEMENT FROM OPTICAL FILTERING

(75) Inventors: Demetrios Nicolau Christodoulides, Allentown, PA (US); Jean-Marc Pierre Delavaux, Franklin Township, Hunterdon County, NJ (US); Christopher Michael McIntosh; Jean Toulouse, both of Bethlehem, PA (US)

(73) Assignees: Lucent Technologies Inc., Murray Hill, NJ (US); Lehigh University, Bethlehem, PA (US)

( * ) Notice: Subject to any disclaimer, the term of this patent is extended or adjusted under 35 U.S.C. 154(b) by 33 days.

(21) Appl. No.: 09/607,616

(22) Filed: Jun. 30, 2000

(51) Int. Cl.$^7$ ................................................. H01S 3/00
(52) U.S. Cl. ..................................................... 359/334
(58) Field of Search ................................ 359/334, 885, 359/337.2; 372/3

(56) References Cited

U.S. PATENT DOCUMENTS

| | | | |
|---|---|---|---|
| 5,216,728 A | | 6/1993 | Charlton et al. ............... 385/27 |
| 5,420,868 A | | 5/1995 | Chaply et al. ............... 359/183 |
| 5,485,480 A | | 1/1996 | Kleinerman ................... 372/6 |
| 5,566,381 A | | 10/1996 | Korotky ....................... 359/183 |
| 5,625,481 A | * | 4/1997 | Tamura et al. ............... 359/179 |
| 5,892,615 A | | 4/1999 | Grubb et al. ................. 359/337 |
| 5,959,750 A | * | 9/1999 | Eskildsen et al. ............ 359/134 |
| 6,118,575 A | * | 9/2000 | Grubb et al. ................. 359/337 |
| 6,178,038 B1 | * | 1/2001 | Taylor et al. ................. 359/341 |

OTHER PUBLICATIONS

R.H. Stolen, Clinton Lee, R.K. Jain, "Development of the Stimulated Raman Spectrum in single–mode Silica Fibers" vol. 1 No. 4/Aug. 1984/Optical Society of America.

C. McIntosh, J. Toulouse, A Yeniay, A Grandpierre, J–M.P Delavaux D. Christodoulides, "Low–frequency Raman scattering in optical fibers", 1999 Optical Society of America.

S.A.E. Lewis, S.V. Chernikov, J.R. Taylor, "Rayleigh Noise Suppression Using a Gain Flattening Filter in a Broadband Raman Amplifier".

A.J. Stentz, S.G. Grubb, C.E. Headley III, J.R. Simpson, T. Strasser, N. Park, "Raman Amplifier with Improved System Performance" OFC '96 Technical Digest.

Fabrizio Forghieri, Robert W. Tkach, Andrew R. Chraplyvy, "Bandwidth of Cross Talk in Raman Amplifiers" OFC '94 Technical Digest.

C.M. McIntosh, D.N. Christodoulides, J. Toulouse, A. Grand–Pierre, J.A. Spirko, J–M.P. Delavaux "Gain Enhancement in a Raman Amplifier via Optical Filtering Techniques", 2000 Optical Society of America.

F. Koch, S.A.E. Lewis, S.V. Chernikov, J.R. Taylor, V. Grubsky, D.S. Starodubov, "Broadband gain flattened Raman Amplifier to extend operation in the third telecommunication window".

* cited by examiner

Primary Examiner—Thomas H. Tarcza
Assistant Examiner—Deandra M. Hughes
(74) Attorney, Agent, or Firm—Wendy W. Koba

(57) ABSTRACT

A fiber Raman amplifier with increased gain and improved pump conversion efficiency is formed by including a high pass optical filter in the amplifier structure. The filter may comprise one or more discrete components, or may be formed as a "distributed" filter along the length of the fiber amplifier. The cut-off frequency for the high pass optical filter is selected to be immediately below the frequency of the input signal to be amplified. When used in an arrangement with multiple input signals, the cutoff frequency is controlled to be immediately below the lowest input signal frequency.

25 Claims, 8 Drawing Sheets

RAMAN AMPLIFIER WITH GAIN ENHANCEMENT FROM OPTICAL FILTERING

TECHNICAL FIELD

The present invention relates to fiber Raman amplifiers.

BACKGROUND OF THE INVENTION

The subject of Raman amplification is well known in the literature. Stimulated Raman amplification is a nonlinear optical process in which an intense pump wave is injected into a medium such as an optical fiber that is carrying one or more optical signals. In fused silica fibers, if the pump wave is of a frequency approximately 13 THz greater than the signal waves, the pump will amplify the signal(s) via stimulated Raman scattering. For example, a pump with a wavelength of 1450 nm will amplify an optical signal at a wavelength of approximately 1550 nm.

Various designs of fiber Raman amplifiers have been used over the past few years, where the gain characteristics of the amplifier have been tailored by changing the pump power, fiber length and fiber composition. In some arrangements, the pump and signals may be "co-propagating" through the fiber. In most cases, however, the pump and signal are "counter-propagating", since this arrangement will allow for the signal to be amplified while minimizing pump-signal cross talk. Moreover, counter-propagating arrangements permit the use of optical circulators, which provide combined multiplexing and isolator functions.

Most of the single pump, single signal amplifiers constructed to date have been optimized for use when the difference between the pump and the signal frequency is tuned near the peak of the Raman gain coefficient (i.e., the 13 THz value mentioned above for fused silica). However, since the Raman gain coefficient in silica- and germanium-based optical fibers begins at the pump frequency, signal amplification is also possible at much smaller separations. More recently, multiple pump wavelengths have been used to further extend the amplification bandwidth. Gain flattening filters have also been used with either single or multiple pumps to provide a relatively flat amplification window for multiple signals.

To date, however, conventional Raman amplifiers display a significant drawback in that any "optical noise" present in the system will also be amplified. The origins of the optical noise may be side modes of the signal or pump(s), or the optical noise created by spontaneous Raman scattering of the pump(s). The amount of noise amplification depends on the frequency shift of the optical noise away from the pump(s) and on the pump power(s). In a strongly pumped amplifier, the noise amplification can be large enough to cause pump depletion. Furthermore, the optical noise at frequency shifts higher than the signal can absorb some of the energy contained in the signal and lead to signal depletion.

Thus, a need remains in the art for overcoming the problems associated with optical noise in fiber Raman amplifiers.

SUMMARY OF THE INVENTION

The need remaining in the prior art is addressed by the present invention, which relates to fiber Raman amplifiers and, more particularly, to the inclusion of one or more high pass optical filters in the amplifier to enhance its gain and improve the pump conversion efficiency.

In accordance with the present invention, a high pass optical filter is included in the amplifier design, where the filter exhibits a cut-off frequency immediately below the signal frequency, with low loss at this frequency and high loss at the unwanted optical noise frequencies. In arrangements utilizing multiple input signals, the high pass filter is configured to exhibit a cut-off frequency immediately below the lowest signal frequency. The resultant high loss at Raman noise frequencies will lead to reduced interactions of the optical noise with the pump(s) and signal(s). Therefore, the signal gain of the amplifier will increase and the pump conversion efficiency will improve.

In one embodiment, the high pass filter may comprise a discrete element, such as a fused silica coupler, a dielectric stack, or long period Bragg gratings. Multiple filters may be utilized in order to reduce noise interaction along the length of the fiber.

In an alternative embodiment, the high pass filter may be of the "distributed" type, achieved by inserting absorbing ions into the core of the transmission fiber, or placing an absorbing layer around the core of the fiber.

High pass optical filtering in accordance with the present invention may also be used in "remote" pumping applications, where the pump input is physically displaced from the amplifying medium. The high pass filter is designed to exhibit a cut-off frequency immediately below the pump frequency, with low loss at this frequency and high loss at the unwanted optical noise frequencies. In arrangements utilizing multiple input pumps, the high pass filter is configured to exhibit a cut-off frequency immediately below the lowest pump frequency. The resultant high loss at Raman noise frequencies will lead to reduced interactions of the optical noise with the pump(s), thus permitting greater pump power to reach the amplifying medium. Thus, the signal gain of the amplifier will increase and the pump conversion efficiency will improve.

High pass optical filtering is also useful in eliminating noise (and thus increasing gain and improving pump conversion efficiency) in so-called "second order" Raman amplifiers, where a first pump is used to amplify a second pump and the second pump is then used to amplify one or more information signals.

Various and other embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
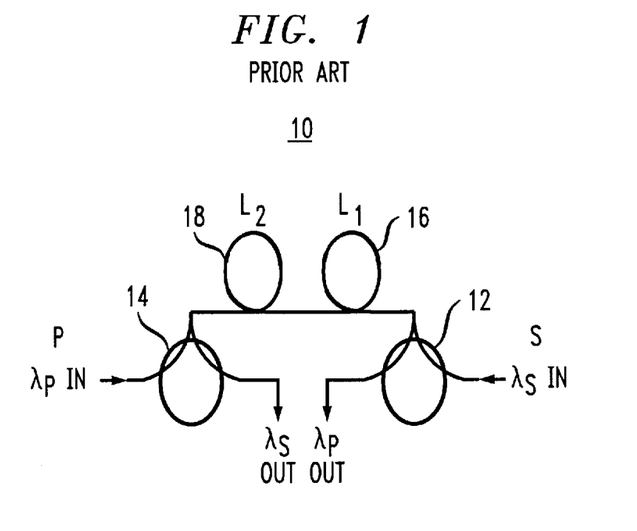
FIG. 1 illustrates an exemplary prior art fiber Raman amplifier arrangement.

FIG. 1 illustrates an exemplary prior art fiber Raman amplifier 10. As shown, an input signal S at a predetermined wavelength $\lambda_S$ (for example, 1550 nm) is applied as an input to a first circulator 12. Other coupling arrangements may be used, where a circulator is considered to be exemplary only (and considered as "preferred" in the sense that a circulator provides both multiplexing and isolation). A pump signal P at a predetermined wavelength $\lambda_P$ (for example, 1450 nm) is applied as an input to a second circulator 14. It is to be noted that various other conventional prior art arrangements may use a plurality of separate pump signals, as well as a plurality of input signals. The arrangement of FIG. 1 illustrates only one type of each signal for the sake of clarity. Referring back to FIG. 1. the amplifying region: itself comprises two sections of fiber, denoted 16 and 18, disposed in series between circulators 14 and 12, respectively. The length of first section 16 is denoted as $L_1$ and the length of second section 18 is denoted as $L_2$. This particular prior art arrangement is exemplary of the "counter-propagating" type of fiber Raman amplifier, with the pump and signal waves traveling in opposite directions through amplifier 10. The amplified signal $S_A$ will then appear as an output from second circulator 14, and any remaining pump signal not depleted by the amplification process will appear as an output from first circulator 12.

Figure 2:
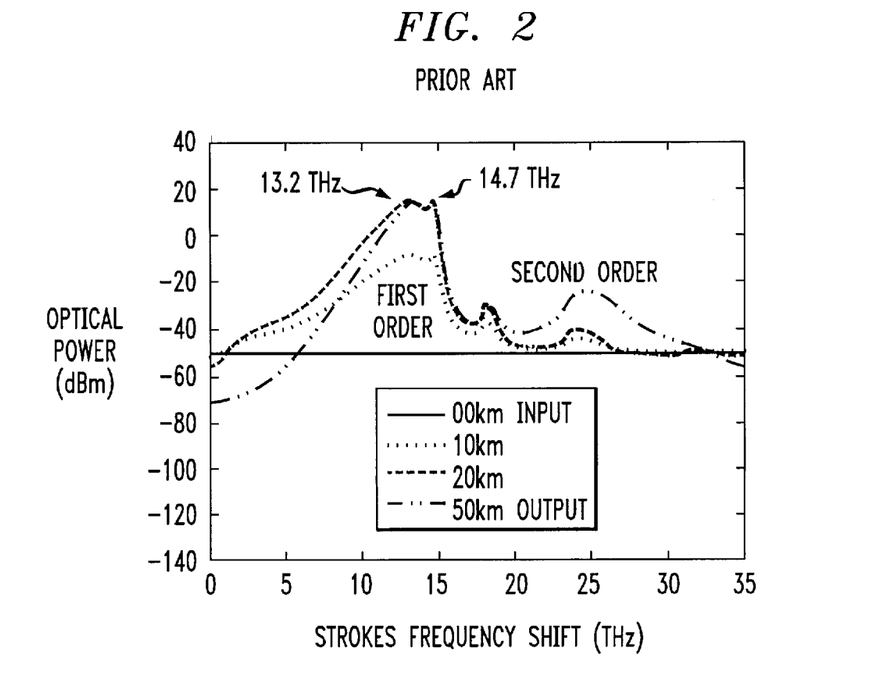
FIG. 2 is a simulation plot of the evolution of stimulated Raman scattering (SRS) noise along the length of the amplifying medium in a prior art arrangement (such as shown in FIG. 1), in the absence of an applied signal.

As mentioned above, fiber Raman amplifiers will inevitably amplify any optical noise, at frequencies lower than that of the pump, injected into the amplifier, as well as the desired signal. Since this noise absorbs the energy contained in both the pump and the signal, the signal gain will be reduced. FIG. 2 is a simulation plot of the stimulated Raman scattering (SRS) noise present in an arrangement such as amplifier 10 of FIG. 1. in the absence of any applied signal. The particular plot of FIG. 2 is associated with a 2W (33 dBm) pump. It is assumed in all of the following simulations that a flat noise background accompanies the pump. This noise may arise from several sources, including spontaneous Raman scattering, side modes from laser sources, etc. For simulation purposes, the continuous noise background will be treated as a discrete function. Every such discrete component is therefore assumed to carry a power $S\Delta f$, where S is defined as the spectral noise density and $\Delta f$ is the frequency range associated with this component. In the simulations, a noise interval $\Delta f$ of 300 GHz is used, and the power in each noise component is presumed to be −50 dBm. For simplicity, any backward or spontaneous scattering has been ignored. The parameters of the fiber optic system are taken to be L=50 km, $\alpha$=0.2 dB/km and $A_{eff}$=50 $\mu m^2$. One half of the parallel Raman gain coefficient is used to approximate polarization randomization effects. For short distances (i.e., short lengths of fiber sections 16 and 18), the noise amplification occurs preferentially at the 12.3 THz gain peak and then shifts to the 14.7 THz line. The SRS threshold (i.e., the point at which the pump and noise powers are equal) occurs, as shown, at 21.7 km. Beyond this threshold distance, light at the 14.7 THz line pumps the second order Raman light (~25 THz).

Figure 3:
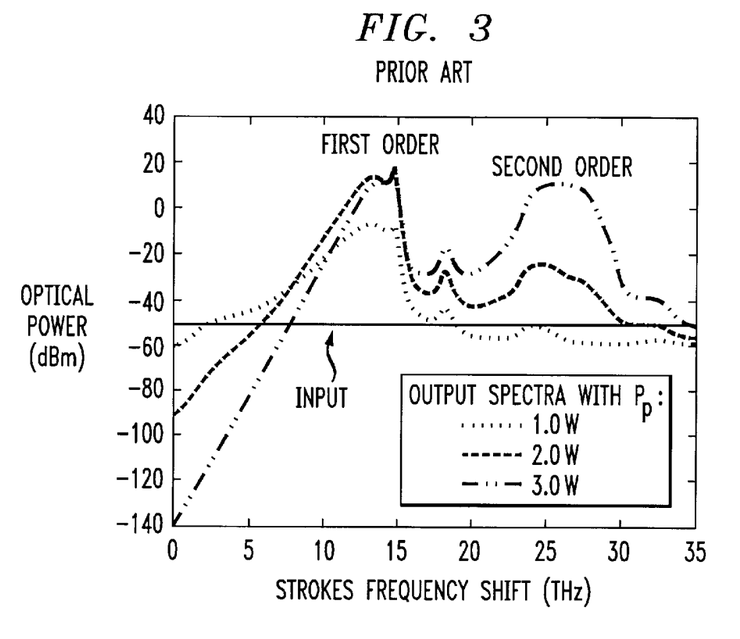
FIG. 3 is a simulation plot of SRS noise in a prior art arrangement (such as that of FIG. 1) as a function of the injected pump power, in the absence of an applied signal.

FIG. 3 is another simulation plot associated with the arrangement of FIG. 1, which in this case illustrates the pump power dependence of the Raman noise amplification. It is to be noted that as the pump power is increased to 3W, a significant amount of second order SRS is created. Note also that as the pump power is increased, noise at a level of approximately 3 THz below the pump loses appreciable power to light at higher frequency shifts.

Figure 4:
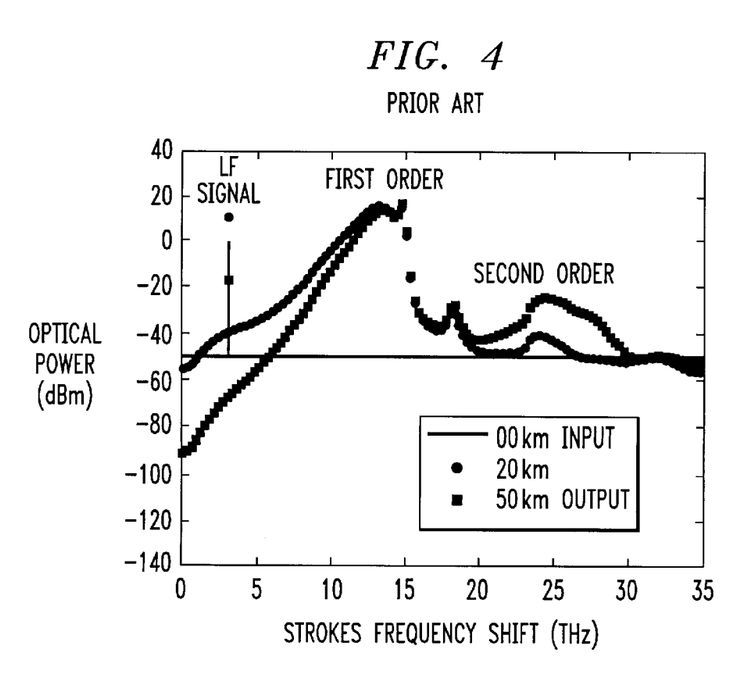
FIG. 4 contains a simulation plot for the same arrangement, with an applied low-frequency-shift signal (i.e., at a frequency 3 THz lower than the pump frequency)

In the presence of SRS noise, a low-frequency-shift (LF) input signal will experience loss in a Raman amplifier which utilizes a strong pump. FIG. 4 is a simulation plot of low-frequency Raman amplifier spectra with 2W input pump power for the arrangement of FIG. 1 (the only difference being that the signal is co-injected). As shown, the signal first experiences moderate gain from the pump (G=10.5 dB at 18.0 km), but then incurs high loss to the Raman light at higher frequency shifts (G=−17.6 dB at the 50 km output). This loss represents 10 dB of attenuation, as well as 7.6 dB of Raman-induced loss.

Figure 5:
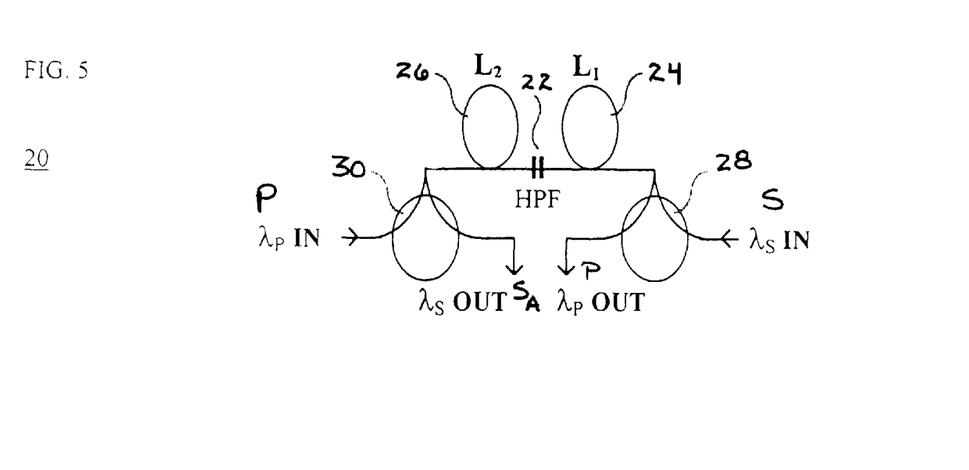
FIG. 5 illustrates a first embodiment of a fiber Raman amplifier formed in accordance with the present invention, including a high pass optical filter disposed between two sections of system fiber.

In accordance with the present invention, the input signal gain can be significantly improved by including a high pass optical filter (with a cut-off frequency immediately below the signal frequency) in the fiber Raman amplifier arrangement. FIG. 5 illustrates an exemplary fiber Raman amplifier 20 formed in accordance with the present invention to include a high pass optical filter 22 in the signal path between a first fiber section 24 and a second fiber section 26. The location of high pass filter 22 may be optimized (in terms of increase in gain) by varying the ratio of $L_1/L_2$ of fiber sections 24 and 26. respectively. As with the prior art arrangement, for this embodiment of the present invention, a signal S is applied as an input to amplifier 20 via a first circulator 28 and pump signal P is applied as an input via a second circulator 30, where pump P is applied as a counter-propagating wave with respect to signal S. The amplified signal SA will exit amplifier 20 at second circulator 30, and any residual pump P will exit at first circulator 28.

In accordance with the present invention, the cut-off frequency of filter 22 is set immediately below the input signal frequency of signal S and will therefore pass the input signal and all light components with higher frequencies. Filter 22 will also severely attenuate all light components with frequencies below that of the signal. In this manner, both the pump P and signal S will experience low loss as they propagate through filter 22, while the unwanted optical noise components will be significantly attenuated. In one embodiment, high pass filter 22 may comprise a fused silica coupler. Alternatively, a stacked dielectric structure may be used to form filter 22. In another embodiment, high pass filter 22 may comprise a long period Bragg grating. In general, any suitable arrangement capable of forming an optical high pass filter may be used.

Figure 6:
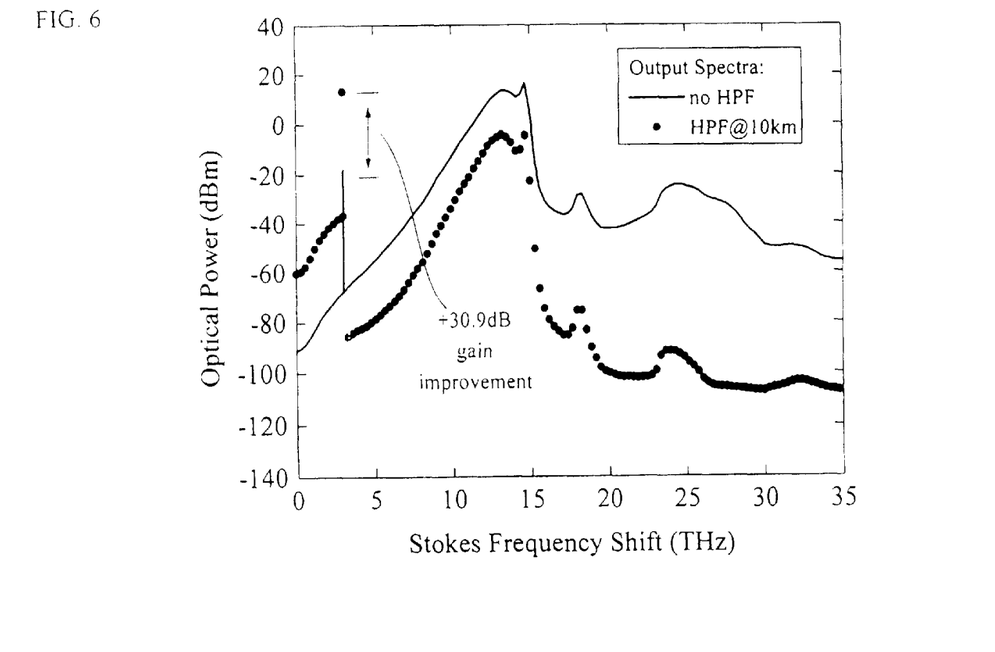
FIG. 6 is a simulation plot of the signal output spectrum for the FIG. 5 embodiment of the present invention, with a high pass filter located after 10 km of transmission fiber.

FIG. 6 illustrates the simulation results of including a high pass filter of the present invention in a conventional fiber Raman amplifier, where for this particular embodiment the filter is inserted after 10 km of fiber and exhibits a 50 dB rejection ratio for all frequencies below its cut-off frequency. As shown, the inclusion of high pass filter 22 reduces both signal and pump depletion to the light at higher frequency shifts, resulting in a low frequency signal gain of approximately +13.3 dB. Therefore, in this particular embodiment of the present invention, the inclusion of a high pass filter provides +30.9 dB of gain improvement over the unfiltered amplifier (illustrated in FIG. 6 for the sake of comparison).

Figure 7:
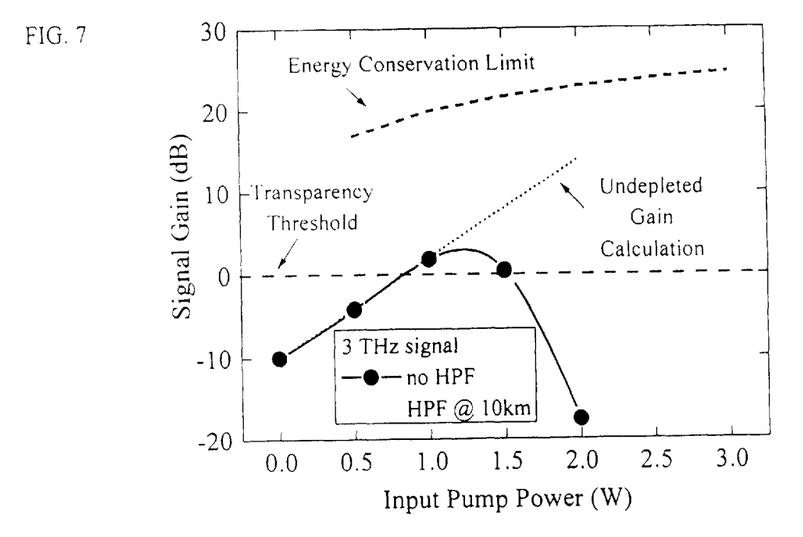
FIG. 7 is a simulation plot of signal gain versus pump power for the FIG. 5 embodiment of the present invention, with a high pass filter located after 10 km of transmission fiber.

FIG. 7 is a simulation plot detailing the low-frequency-shift.(LF) signal gain as a function of the input pump power. For pump powers less than 1.0W, the LF signal gain increases in accordance with the undepleted gain approximation. However, a pump powers of 1.0W and higher, the LF signal gain is reduced significantly when no high pass filtering is used. This is due to the pump and signal depletion from optical noise at higher frequency shifts. With the inclusion of a high pass filter after 10 km of transmission fiber, in accordance with the present invention, the signal gain increases again in accordance with the undepleted gain approximation. It is to be noted, however, that while the pump conversion efficiency improves with the utilization of a high pass filter, the signal gain does not reach the energy conservation limit (i.e., total conversion of pump photons to signal photons).

Figure 8:
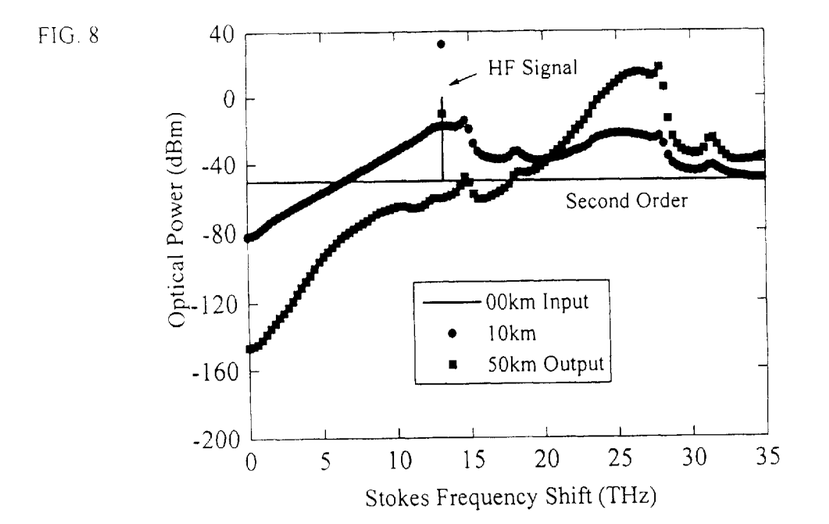
FIG. 8 contains a simulation plot for a conventional prior art arrangement with the application of a high-frequency-shift input signal (i.e., at a frequency 13.2 THz lower than the pump frequency)

As with the low frequency input signal case, it is also possible to use a high pass filter with an arrangement for amplifying a high-frequency-shift input signal. FIG. 8 is a simulation graph of a conventional high frequency Raman amplifier spectra with 3W input pump power and a 1 mW co-injected signal. In this case, the signal loss is due to depletion by second order SRS. As shown, the 3W (34.8 dBm) pump transfers its energy to a signal at the 13.2 THz Raman peak. The signal power surpasses the pump power at a distance of 4.7 km and reaches a maximum gain of 32.9 dB at a distance of 7.2 km. Afterward, the signal amplifies (and is hence depleted by) second order Raman light. The gain at the 50 km fiber output is −10.4 dB.

Figure 9:
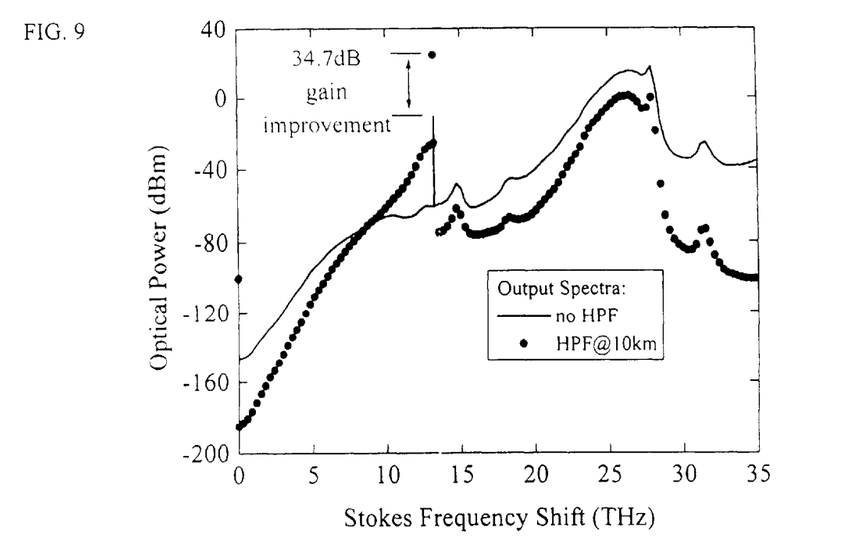
FIG. 9 is a simulation plot for an arrangement of the present invention subjected to the same high-frequency-shift input signal.

By including a high pass optical filter in this particular arrangement, a significant improvement in gain is realized in the simulation, as shown in FIG. 9. In this particular embodiment, a high pass filter is inserted after 10 km of fiber to eliminate the second order SRS. With this filter, the gain at 50 km is now shown to be approximately +24.3 dB. Therefore, by including a high pass filter in the high frequency fiber Raman amplifier arrangement, a gain improvement of 34.7 dB over the unfiltered amplifier is realized.

Figure 10:
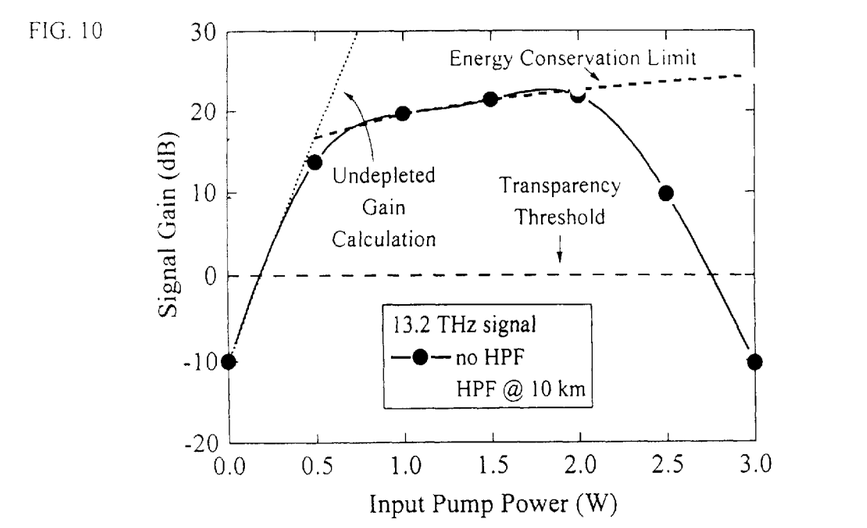
FIG. 10 is a simulation plot of the high-frequency-shift signal gain versus pump power for an arrangement of the present invention, with a high pass filter located after 10 km of transmission fiber.

FIG. 10 is a simulation plot detailing the high-frequency-shift signal gain as a function of the input pump power. Even for a pump power of 0.5W, the high frequency gain deviates from the undepleted gain approximation and quickly reaches the energy conservation limit (i.e., total conversion of pump photons to signal photons). However, at pump powers of 2.0W and higher, the signal gain is reduced significantly when no high pass filtering is applied, due to signal depletion via second order SRS. With the utilization of a high pass filter in accordance with the present invention, the signal gain increases again to nearly the energy conservation limit.

Figure 11:
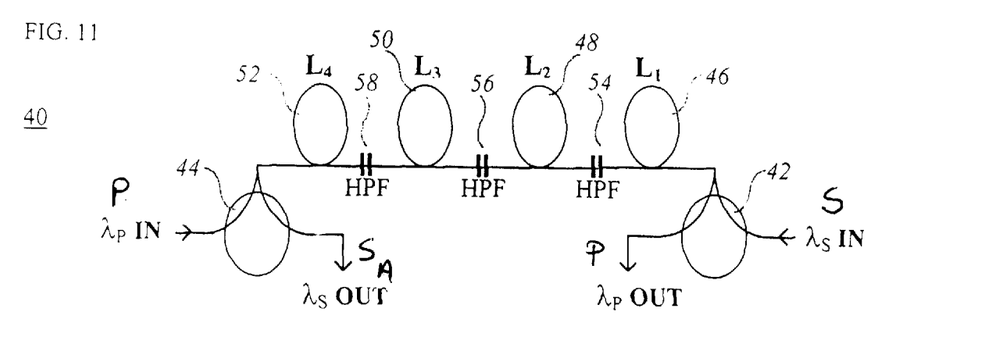
FIG. 11 illustrates an alternative embodiment of the present invention, including a set of three high pass filters distributed along the length of the fiber Raman amplifier.

FIG. 11 illustrates an alternative embodiment 40 of the present invention utilizing a plurality of separate high pass optical filters distributed along the amplifying fiber. In this particular embodiment, the input signal S (at a predetermined wavelength $\lambda_S$) is applied as an input to a first circulator 42 and a pump signal P (at a predetermined wavelength $\lambda_P$) is applied as an input to a second circulator 44. The fiber amplifier portion comprises four fiber sections 46, 48, 50 and 52, disposed as shown in FIG. 11. A set of three high pass optical filters is included in this particular embodiment, with a first filter 54 disposed between fiber sections 46 and 48, a second filter 56 disposed between fiber sections 48 and 50, and a third filter 58 disposed between fiber sections 50 and 52. As an alternative to disposing a plurality of discrete filters along the length of the fiber Raman amplifier, a "distributed" filter arrangement can be used. For example, absorbing ions may be inserted into the core of the transmission fiber itself to filter out the unwanted optical noise. In another embodiment, a layer of optically absorbing material may be disposed to surround the core of the fiber and used to filter out the noise. In general, any arrangement capable of providing the required high pass optical filtering may be used and is considered to fall within the spirit and scope of the present invention.

Figure 12:
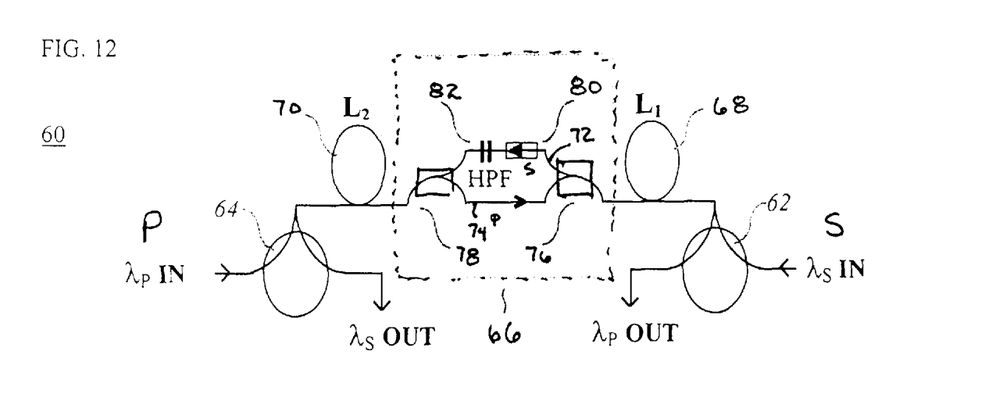
FIG. 12 is yet another embodiment of the present invention, utilizing mid-stage isolation and high pass filtering.

FIG. 12 illustrates an embodiment 60 of the present invention which utilizes a "mid-stage" isolator incorporating a high pass filter. As shown, a signal S is applied as an input to a first circulator 62 and a pump P is applied as an input to a second circulator 64. A mid-stage isolator arrangement 66 is disposed between a first fiber section 68 and a second fiber section 70, where isolator arrangement 66 permits the counter-propagating pump P and signal S to travel through two separate paths 72 and 74, by means of a pair of wavelength division multiplexers 76 and 78, as shown. An optical isolator 80 is included in path 72 associated with signal S to prevent reflected portions of signal S, as well as optical noise, from propagating in the reverse direction. By using separate paths for signal S and pump P, the pump is not attenuated by isolator 80. This isolation permits more efficient signal amplification in first fiber section 68 and reduces noise due to double Rayleigh scattering. As shown, a high pass optical filter 82 of the present invention is disposed in path 72 with isolator 80 and thus provides the desired filtering to the input signal so as to remove the optical noise components. The location of isolator arrangement 66 may be optimized (in terms of increase in gain and decrease of noise figure) by varying the ratio of $L_1/L_2$.

Figure 13:
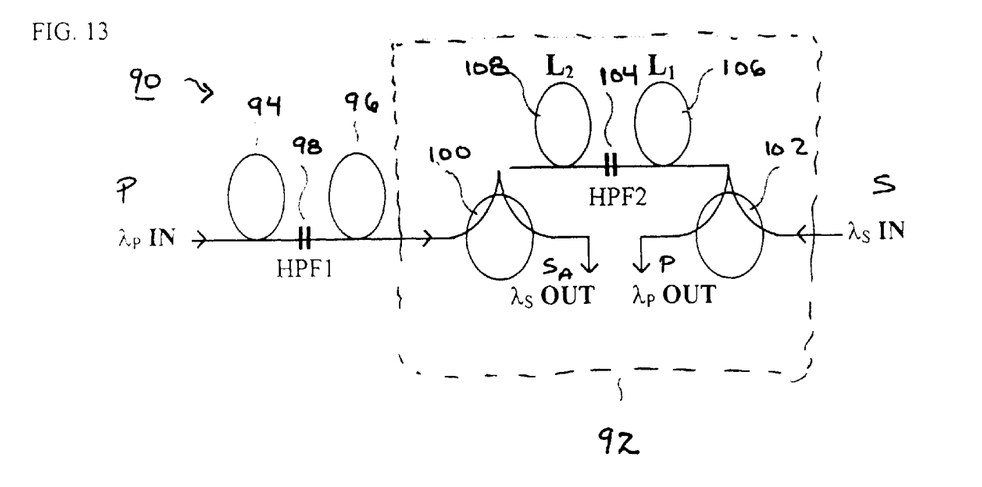
FIG. 13 illustrates an embodiment of the present invention which utilizes remote pumping with high pass filtering and incorporates high pass filtering in the amplifying medium to improve the amplifier gain.

There are also arrangements in optical communication systems where the pump(s) used in a Raman fiber amplifier is/are located at a distance from the amplifying fiber. Defined as a "remote pumping" arrangement, a strong pump signal is desired. In this instance, the pump (in conventional arrangements) may lose a significant amount of its energy to Raman noise before it even enters the amplifier structure. FIG. 13 illustrates an exemplary arrangement 90 of the present invention incorporating high pass filtering with a remote pump to allow for a larger amount of pump power to enter the amplifier structure. As shown, pump P is disposed at a distance from fiber Raman amplifier 92, where the pump first propagates through a first fiber section 94 and second fiber section 96 before being applied as an input to amplifier 92. In accordance with the present invention, a high pass filter 98 is disposed in the pump path between first fiber section 94 and second fiber section 96. The cut-off frequency of filter 98 is set immediately below the pump frequency and will therefore severely attenuate all light components below the pump frequency. Therefore, high pass filter 98 reduces the pump's energy loss to unwanted optical noise components and minimizes the presence of optical noise traveling with pump P as it is applied as an input to a first circulator 100. Input signal S is applied as an input to a second circulator 102. It is to be understood that fiber Raman amplifier 92 may comprise either a conventional fiber amplifier or any of arrangements of the present invention discussed above, incorporating a second high pass filter 104 along the signal path between a first fiber section 106 and a second fiber section 108 to further reduce the presence of optical noise within the amplifier itself.

Figure 14:
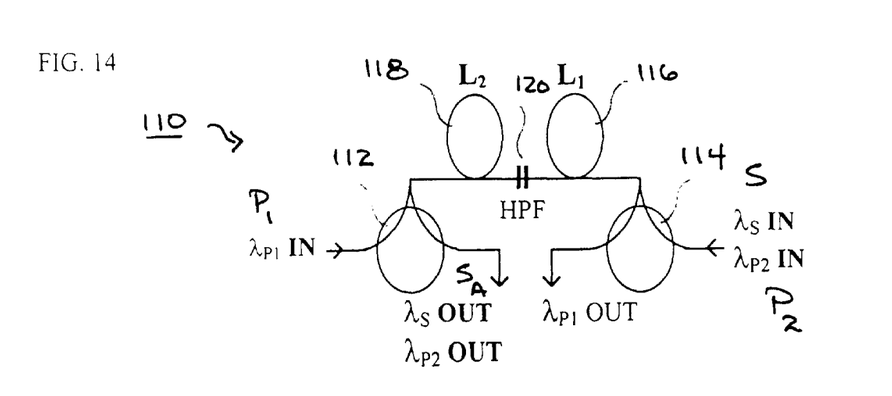
FIG. 14 illustrates a "second order" pumping fiber Raman amplifier using high pass filtering in accordance with the present invention.
Figure 15:
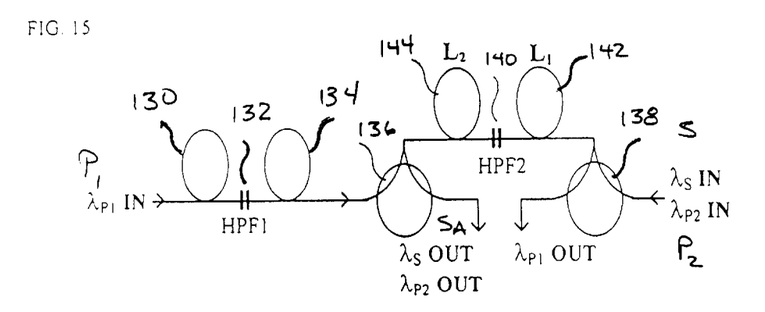
FIG. 15 illustrates yet another embodiment of the present invention, combining second-order pumping and a remote pumping with high pass filtering of the present invention.

"Second order" pumping in a fiber Raman amplifier may also be utilized in an arrangement of the present invention. Second order pumping refers to using a first pump to amplify a second pump, then using the second pump to amplify one or more signals. FIG. 14 illustrates an exemplary fiber Raman amplifier 110 using second order pumping in an arrangement of the present invention. In this arrangement, a first pump, denoted $P_1$, is applied as an input to a first circulator 112 and a second pump, denoted $P_2$, is applied as an input to a second circulator 114. For this particular embodiment, a signal S is also applied as an input to second circulator 114. Fiber Raman amplifier 110 includes two separate sections of amplifying fiber, denoted 116 and 118, with a high pass filter 120 disposed between the two sections of fiber 116 and 118. As shown in FIG. 15, the concepts of remote pumping and second order pumping may be combined in yet another embodiment of the present invention. In this arrangement, a first pump signal $P_1$ propagates through a first fiber section 130, passes through a first high pass filter 132 and then passes through a second fiber section 134, where a termination of second fiber section 134 is coupled as an input to a first circulator 136. A second pump signal $P_2$ and input signal S are applied as shown as inputs to a second circulator 138. A second high pass filter 140 is included within the amplifier and positioned between a first amplifying fiber section 142 and a second amplifying fiber section 144.

Figure 16:
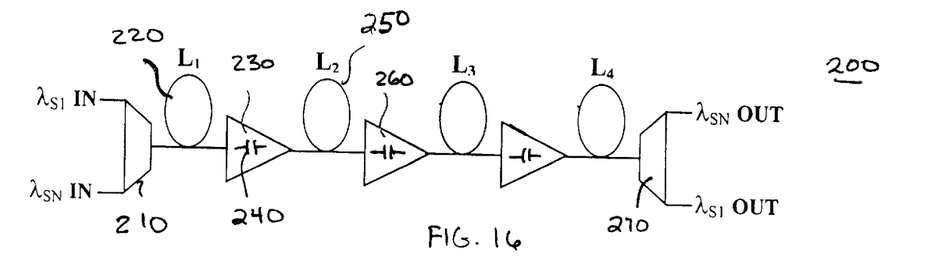
FIG. 16 is a diagram of an exemplary optical communication system utilizing a plurality of concatenated fiber Raman amplifiers in accordance with the present invention.

There are various types of optical transmission systems that require amplification of the transmitted optical signal, where a fiber Raman amplifier of the present invention may suitable be used. For example, long haul optical systems may require a plurality of optical amplifiers disposed at predetermined locations along the transmission span to prevent unacceptable levels of attenuation within the system. FIG. 16 illustrates, in simplified block diagram form, an exemplary long-haul optical transmission system 200 that is capable of using fiber Raman amplifiers of the present invention. As shown, one or more input signals $S_1$–$S_N$, operating at associated signal wavelengths $\lambda_1$–$\lambda_N$, are applied as inputs to a wavelength division multiplexer 210 that functions to multiplex this plurality of input signals onto an optical signal path 220, where path 220 may comprise an optical fiber, optical waveguide, or any other suitable medium for supporting optical transmission. The optical signals propagating along optical signal path 220 become sufficiently attenuated after propagating a distance $L_1$ such that amplification is required. A first fiber Raman amplifier 230 is disposed as shown in FIG. 16 to provide amplification of the plurality of input signals, where any of the various embodiments of a fiber Raman amplifier utilizing a high pass filter 240 in accordance with the present invention may be used. As with the arrangements discussed above, the cut-off frequency of high pass filter 240 is chosen to be immediately below the lowest signal frequency of the plurality of frequencies $\lambda_1$–$\lambda_N$. Thereafter, the amplified optical signal propagates along a second optical signal path 250 and is again amplified within a fiber Raman amplifier 260 of the present invention. In general, any desired number of fiber spans and fiber Raman amplifiers may be used before the plurality of signals reaches its destination. in this example, a wavelength division demultiplexer 270, which functions to separate out the plurality of transmitted signals $S_1$–$S_N$ along a plurality of separate receive signal paths.

Figure 17:
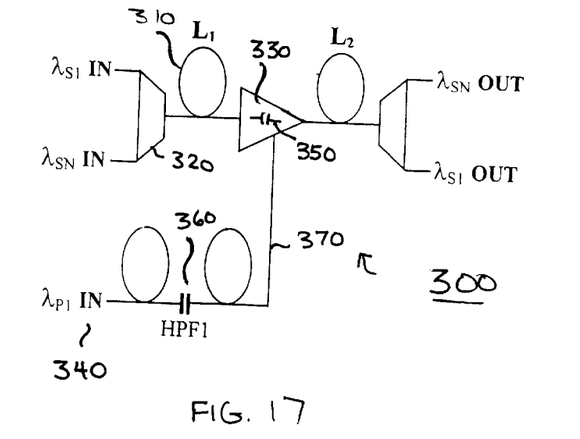
FIG. 17 illustrates an alternative point-to-point optical communication system utilizing a remotely-pumped fiber Raman amplifier formed in accordance with the present invention.

FIG. 17 illustrates an alternative optical communication system architecture utilizing a fiber Raman amplifier of the present invention. As shown, an optical communication system 300 is used to transmit a plurality of optical signals $S_1$–$S_N$, operating at associated signal wavelengths $\lambda_1$–$\lambda_N$ (or in a simple form, a single optical signal S), the plurality of signals being multiplexed onto a single optical signal path 310 using a wavelength division multiplexer (WDM) 320. A fiber Raman amplifier 330 is illustrated as disposed along optical signal path 310, where in this embodiment a remote pump P is used (where pump P may include one or more separate pump sources, each source operating a different pump wavelength $\lambda_{P1}$–$\lambda_{PM}$). Fiber Raman amplifier 330 may comprise either a conventional fiber amplifier or a fiber Raman amplifier of the present invention, including at least one high pass filter 350, where the cut-off frequency of filter 350 is chosen to be immediately below the lowest signal frequency associated with signal wavelengths $\lambda_1$–$\lambda_N$. As shown in FIG. 17, a high pass filter 360 is required in accordance with the remote pumping architecture along pump path 370 and used to couple remote pump source P to fiber Raman amplifier 330.

What is claimed is:

1. A fiber Raman amplifier comprising
   a section of single mode fiber comprising a core for producing stimulated emission of light via Raman scattering within a predetermined band of wavelengths, including at least one signal wavelength $\lambda_S$, when pumped with at least one optical signal at a predetermined wavelength $\lambda_P$;
   a first arrangement for coupling at least one input optical signal to the section of single mode fiber;
   a second arrangement for coupling at least one optical pump signal to said section of single mode fiber; and
   a high pass optical filter exhibiting a cut-off frequency immediately below that of the lowest frequency input signal, said high pass filter disposed along said section of single mode fiber.

2. A fiber Raman amplifier as defined in claim 1 wherein the at least one input signal comprises a single input signal.

3. A fiber Raman amplifier as defined in claim 1 wherein the at least one input signal comprises a plurality of input signals, each operating at a different frequency with the high pass filter exhibiting a cut-off frequency immediately below the lowest input signal frequency.

4. A fiber Raman amplifier as defined in claim 1 wherein the at least one optical pump signal comprises a single optical pump signal.

5. A fiber Raman amplifier as defined in claim 1 wherein the at least one optical pump signal comprises a plurality of optical pump signals.

6. A fiber Raman amplifier as defined in claim 5 wherein the plurality of optical pump signals comprises a pair of optical pump signals configured to provide second-order pumping with a first optical pump signal of said pair of signals used to amplify a second optical pump signal of said pair of signals and said second amplified pump used to amplify the at least one input optical signal.

7. A fiber Raman amplifier as defined in claim 1 wherein the high pass optical filter comprises a discrete optical filtering arrangement.

8. A fiber Raman amplifier as defined in claim 7 wherein the discrete optical filtering arrangement comprises a plurality of separate optical filters disposed along the length of the single mode fiber.

9. A fiber Raman amplifier as defined in claim 7 wherein the discrete optical filtering arrangement comprises a single high pass optical filter disposed at a predetermined location along the section of single mode fiber.

10. A fiber Raman amplifier as defined in claim 7 wherein the discrete optical filtering arrangement comprises a fused silica optical coupler.

11. A fiber Raman amplifier as defined in claim 7 wherein the discrete optical filtering arrangement comprises a stacked dielectric device.

12. A fiber Raman amplifier as defined in claim 7 wherein the discrete optical filtering arrangement comprises a long period Bragg grating.

13. A fiber Raman amplifier as defined in claim 1 wherein the optical filtering arrangement comprises a distributed optical filter.

14. A fiber Raman amplifier as defined in claim 13 wherein the distributed optical filter comprises a layer of absorbing material disposed around the core of the amplifying fiber.

15. A fiber Raman amplifier as defined in claim 13 wherein the distributed optical filter comprises absorbing ions disposed in the core of the amplifying fiber.

16. A fiber Raman amplifier as defined in claim 1 wherein the second arrangement for coupling at least one optical pump comprises a plurality of fiber sections including a high pass optical filter disposed between adjacent sections, with at least one pump signal applied as an input to a first fiber section of said plurality of fiber sections and the output from a last fiber section of said plurality of fiber sections coupled to said single mode fiber.

17. A fiber Raman amplifier comprising
a section of single mode fiber comprising a core for producing stimulated emission of light via Raman scattering within a predetermined band of wavelengths, including at least one signal wavelength $\lambda_S$, when pumped with at least one optical pump signal at a predetermined wavelength $\lambda_P$;
a pump source for producing said least one optical pump signal, said pump source at a predetermined location remote from said section of single mode fiber;
a first arrangement for coupling at least one input optical signal to the section of single mode fiber;
a second arrangement for coupling at least one optical pump signal to said section of single mode fiber; and
a high pass optical filter exhibiting a cut-off frequency immediately below that of the lowest frequency pump, said high pass filter disposed between said pump source and said section of single mode fiber.

18. A fiber Raman amplifier as defined in claim 17 wherein the amplifier further comprises a second high pass filter disposed along the section of single mode fiber, said second high pass filter exhibiting a cut-off frequency immediately below that of the lowest frequency input optical signal.

19. An optical transmission system in an environment including an optical transmitter for providing at least one input optical signal at a predetermined wavelength $\lambda_S$ and an optical receiver for receiving said at least one input optical signal the optical transmission system comprising
an optical signal path, disposed between said optical transmitter and said optical receiver, said optical signal path including at least one optical amplifier arrangement comprising
a section of single mode fiber comprising a core for producing stimulated emission of light via Raman scattering within a predetermined band of wavelengths, including at least said signal wavelength $\lambda_S$, when pumped with at least one optical signal at a predetermined wavelength $\lambda_P$;
a first arrangement for coupling said at least one input optical signal from said optical signal path to the section of single mode fiber;
a second arrangement for coupling at least one optical pump signal to said section of single mode fiber; and
a high pass optical filter exhibiting a cut-off frequency immediately below that of the lowest frequency input signal, said high pass filter disposed along said section of single mode fiber.

20. An optical transmission system as defined in claim 19 wherein the system comprises a plurality of fiber Raman amplifiers disposed in series along the optical signal path.

21. An optical transmission system as defined in claim 19 wherein the optical transmitter comprises a plurality of separate optical signals from a plurality of separate sources and a wavelength division multiplexer for combining the plurality of separate signals and coupling the plurality of separate signals onto the optical signal path.

22. An optical transmission system as defined in claim 19 wherein the optical receiver is responsive to a plurality of separate optical signals and includes a wavelength division demultiplexer for separating the plurality of signals and distributing the plurality of signals onto separate output signal paths.

23. An optical transmission system as defined in claim 19 wherein at least one fiber Raman amplifier comprises a remotely pumped fiber amplifier including a high pass optical filter disposed between a remote pump source and the section of single mode fiber.

24. An optical transmission system in an environment including an optical transmitter for providing at least one input optical signal at a predetermined wavelength $\lambda_S$ and an optical receiver for receiving said at least one input optical signal, the optical transmission system comprising
an optical signal path, disposed between said optical transmitter and said optical receiver, said optical signal path including at least one optical amplifier arrangement comprising a section of single mode fiber comprising a core for producing stimulated emission of light via Raman scattering within a predetermined band of wavelengths, including at least said signal wavelength $\lambda_S$, when pumped with at least one optical signal at a predetermined wavelength $\lambda_P$;

a remote pump source for providing at least one optical pump, said remote pump disposed at a predetermined distance from said section of single mode fiber;

a first arrangement for coupling said at least one input optical signal from said optical signal path to the section of single mode fiber;

a second arrangement for coupling said remote pump source to said section of single mode fiber; and a high pass optical filter exhibiting a cut-off frequency immediately below that of the lowest frequency optical pump, said high pass filter disposed along said optical transmission path between said remote pump and said section of single mode fiber.

25. An optical transmission system as defined in claim 24 wherein the system further comprises at least one high pass filter disposed along the section of single mode fiber, said at least one high pass filter exhibiting a cut-off frequency immediately below the lowest frequency input signal.

* * * * *